March 18, 1969     H. SIMON     3,432,967
MOVABLE COVER WITH LOCKING AND DETENTING MEANS
Filed Aug. 15, 1967
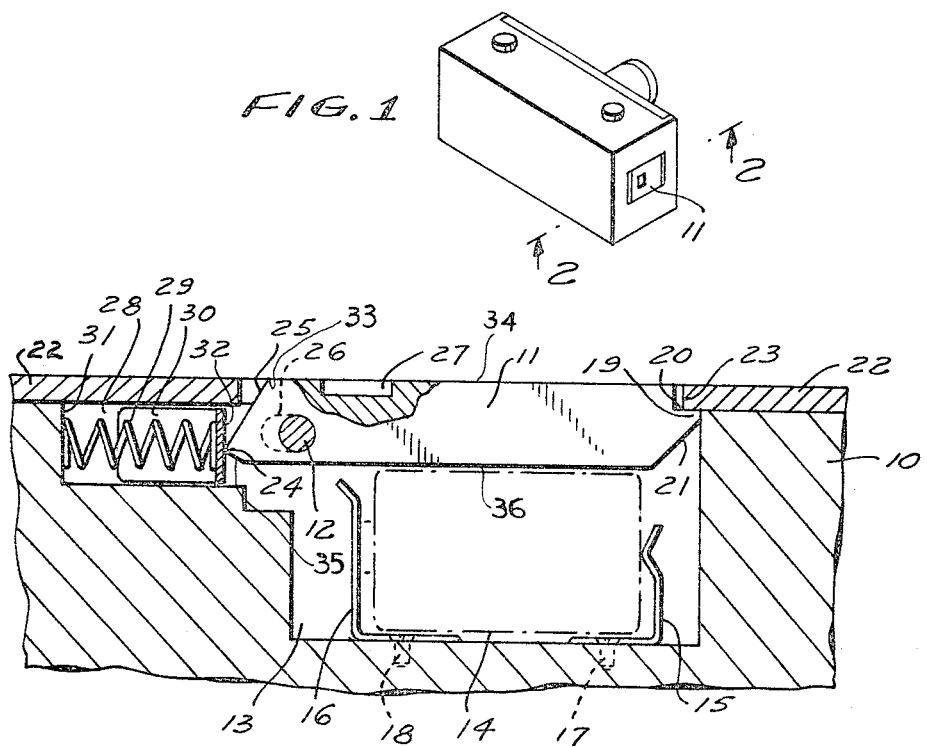
FIG.1
FIG.2
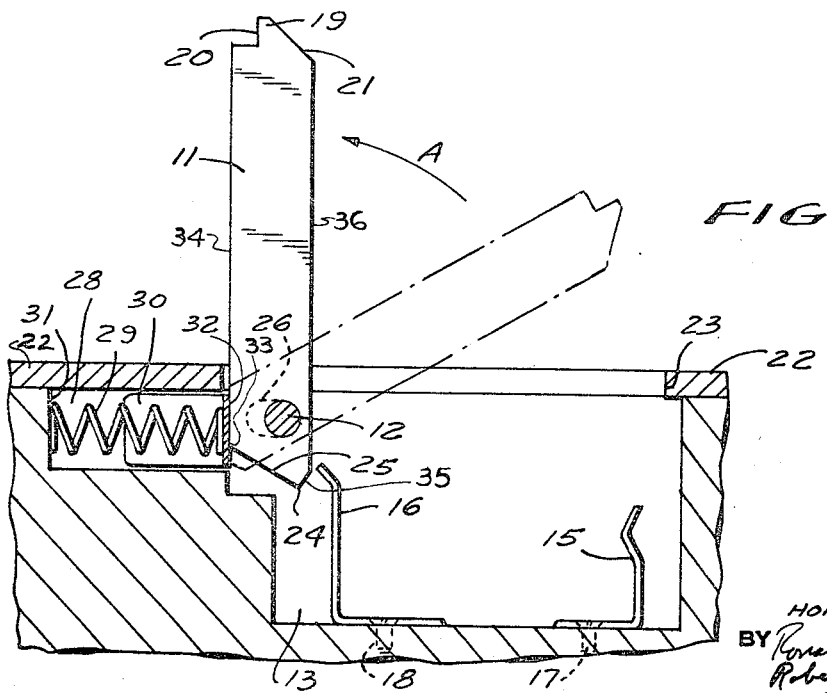
FIG.3
INVENTOR
HORST SIMON
BY Russell S Clausen
Robert W Hampton
ATTORNEYS United States Patent Office 3,432,967
Patented Mar. 18, 1969

3,432,967
MOVABLE COVER WITH LOCKING AND DETENTING MEANS
Horst Simon, Fellbach, near Stuttgart, Germany, assignor to Eastman Kodak Company, Rochester, N.Y., a corporation of New Jersey
Filed Aug. 15, 1967, Ser. No. 660,747
Claims priority, application Germany, Aug. 26, 1966, K 55,345
U.S. Cl. 49—386                9 Claims
Int. Cl. E05f 1/10; E05c 17/10, 19/06

ABSTRACT OF THE DISCLOSURE

A cover provided with locking means for securing it in its closed position and detenting means for holding it in at least one open position, the cover being hinged in slots to permit longitudinal sliding thereof for locking and unlocking when in its closed position and rotation thereof for movement between its closed and open positions.

BACKGROUND OF THE INVENTION

Field of the invention

This invention relates generally to body cavity closures, and particularly to movable covers for opening and closing battery cavities in photographic apparatus.

Description of the prior art

Photographic apparatus, both still and movie, have increasingly employed battery-operated features. These have included integral features, such as automatic battery-operated exposure setting devices, battery-driven electric motors for film advance, battery-operated indicator lamps for high or low exposure, and battery-operated exposure meters which do not necessarily act to control shutter speed or diaphragm opening. Additionally, in recent years, there has been an increasing tendency to incorporate the flash unit of a still camera in the camera body rather than make it a separable part. Each of these features, obviously, requires inclusion of cavities within the camera body to accommodate the batteries necessary for operating such equipment.

Covers that enclose such cavities must be openable from the outside, preferably without need of specialized tools or excessive force to effect their opening. At the same time, such covers must not fit so loosely that light can be admitted into the camera cavity, nor must their locks be so easily disengaged that the cover can be accidentally opened during operation of the camera. Because, in most photographic equipment, the polarity direction of a battery is important, the cover must freely remain open so that the user can easily discern the polarity markings shown in the camera and insert a battery in the proper direction.

Prior-art covers have been defective in at least one of the respects mentioned above. Many have required screw drivers, often specialized, or excessive force to open them. Sliding covers have been provided for battery cavities, but their locks often have not been sufficiently positive to prevent their being accidentally opened during operation of the camera, particularly after considerable use.

Many of the prior-art covers have no provision for positively retaining them in an open, or partially open, position. This, too, makes insertion of parts, such as batteries, into the cavity extremely difficult because care must be exercised in holding the cover open while working with the parts being inserted. Further, if the cover is not a hinged one, either considerable care must be taken in reattaching the cover to the apparatus or considerable force must be employed, as is needed, for example, to overcome the force of a spring used to hold various parts in place, as with the screw-cap type of cover on the battery case of a flash gun.

The problems that have been described with respect to a cover for a battery cavity obviously apply equally well to a cover for the film cavity of a camera. An additional problem with the film-cavity cover is that accidental opening of the cover can result in fogging of film.

SUMMARY OF THE INVENTION

The present invention comprises a closure having a hinged cover that is positively lockable in its closed position, openable with a minimum of force, and capable of being retained in at least one open position. More particularly, the invention comprises, for a closure in photographic equipment, a hinged cover that is positively lockable in a closed position flush with the casing of such equipment and readily retainable in a plurality of open positions.

Generally stated, the preferred embodiment of this invention comprises a cover that is hinged about movable pins, or a movable axle, so that it is capable of both rotational and translational movement. Biasing means are provided at the hinged end of the cover to force the cover in one direction so that, at the opposite end, a shoulder and flange become engaged to lock the cover positively in its closed position. By a small amount of suitably directed force, the cover can first be moved longitudinally against the biasing action to release the lock and then be pivoted about its axis to open it.

The end of the cover nearest the pivot can be so formed that, when the cover is partially opened, the biasing means acts upon it in such a way as to retain it in such partially open position. Further movement of the cover is also possible, in association with the pivoting means and the biasing means, to allow a fully open position.

Similarly, utilizing such rotational and translational movement, the cover can be returned to its closed position to provide positive locking thereof. In its positively locked position, the cover is flush with the surface of the casing in which the cavity is formed, resulting in a more pleasing appearance and the absence of protrusions by which the cover might be caught and accidentally opened.

BRIEF DESCRIPTION OF THE DRAWING

In the accompany drawing:

FIG. 1 is a perspective view of a still camera showing the external surface of a cover according to the present invention;

FIG. 2 is an enlarged partial sectional plan view along the line 2—2 of FIG. 1, with a portion broken away to better illustrate the force receiving means; and FIG. 3 is a view similar to FIG. 2, showing in solid lines the cover in its fully open position, and in broken lines the cover in a partly open position.

DESCRIPTION OF THE PREFERRED EMBODIMENT

In the drawing there is illustrated a camera having a body 10 to which is mounted a cover 11 by means of at least one pivot 12. Within the body 10, adjacent to cover 11, is a cavity 13 which, in FIG. 2, is shown as a cavity for holding a battery 14. Battery 14 is mounted between contact springs 15 and 16, which are mechanically atached to camera body 10 by known means such as screws 17 and 18. Contact springs 15 and 16 are electrically connected, by means not shown, to some electrically operated device, such as a flash gun, either integral with or attachable to the camera.

Cover 11 is formed at one end with a shoulder 19 having a lip 20 and a beveled surface 21. A wall 22 of camera body 10 is extended to provide a flange 23 to engage lip 20. Cover 11 is formed at the opposite end, adjacent to pivot 12, as a wedge-shaped member having an apex 24, the sides of the wedge being unequal in length, the longer side 25 thereof forming an obtuse angle, at vertex 33, with the outer surface 34 of cover 11. Pivot 12, which can be a single rod or a pair of pins, rides in an elongate slot 26 formed in body 10. Adjacent to pivot 12, in the outer surface of cover 11, is a recess 27.

A channel 28 formed in body 10 and covered by wall 22 contains a compression spring 29, one end of which is placed within a U-shaped guide 30. The opposite end of spring 29 rests against the end portion 31 of channel 28. The base of guide 30 provides a bearing surface 32.

The direction of rotational movement of cover 11 is indicated in FIG. 3, with cover 11 shown in a partially open position by broken lines and in a fully open position by solid lines.

In operation, taking the closed position of cover 11 as a starting point, force is applied at recess 27 to push cover 11 longitudinally against the biasing influence of spring 29, thus sliding pivot 12 within slot 26. This effects release of lip 20 from flange 23, thus permitting rotation of cover 11 about pivot 12. Camera body 10 and wall 22 can, of course, be formed in one piece provided a flange overlies a portion of the cavity, as does flange 23.

The location of recess 27, where force is applied, aids in such longitudinal movement and pivoting because of its relation to pivot 12 and slot 26. The location of recess 27 close to pivot 12 is such as to render the force applied to move cover 11 longitudinally essentially ineffective after lip 20 has become disengaged from flange 23, thus facilitating the pivoting, or rotation, of cover 11 to an open position.

Spring 29, against which cover 11 is longitudinally moved, is illustrated as a compression spring retained by a guide 30 in a channel 28 formed between camera body 10 and wall 22. It should be understood, however, that this portion of the device could take a variety of forms. For example, a block of plastic material could be formed with a blind hole therein to receive the inner end of spring 29, or a leaf spring could be used, without such a hole or channel, to accomplish the same result.

When cover 11 has been moved longitudinally to such a point that lip 20 is released from flange 23, cover 11 is rotated in the direction indicated by the arrow A until it reaches the partially open position shown in broken lines in FIG. 3. In this position spring 29 and bearing surface 32 act upon longer side 25 of the wedge-shaped end of cover 11. In this manner, the combined action of spring 29, bearing surface 32, and longer side 25 acts to retain cover 11 in this partially open position.

To place cover 11 in its fully open position, movement thereof is continued in the direction of arrow A, causing vertex 33, acting as a cam against bearing surface 32, acting as a cam follower, to compress spring 29 and permit further rotational movement of cover 11. When cover 11 reaches its fully open position, shown in solid lines in FIG. 3, bearing surface 32, under the influence of spring 29, bears against a portion of outer surface 34 of cover 11 to retain cover 11 in said fully open position.

To allow for easy rotational movement of cover 11 during the opening operation, the axis of rotation, at the center of pivot 12, is placed on a line approximately bisect the obtuse angle included between the surfaces meeting at vertex 33. Apex 24 of the wedge can be either pointed or rounded in shape. If rounded, its radius preferably should be at least half the distance between the interior surface 36 of cover 11 and the axis of rotation as previously defined. Such a dimension aids in preventing the frictional force between apex 24 and bearing surface 32, resulting from the normal force of spring 29, from being too great to overcome during rotational movement of cover 11. Similarly, shorter side 35 of the wedge has a width approximately the same as that of lip 20 to assure location of apex 24, whether pointed or rounded, at such a point that force applied to recess 27, for unlocking and moving cover 11 to its partially open position, can be suitably directed against bearing surface 32 and spring 29.

Cover 11 is closed by pushing against outer surface 34 so that vertex 33 bears against bearing surface 32 to compress spring 29 and permit rotation of cover 11 to the partially open position. Continued pushing against outer surface 34 causes further rotation of cover 11 until beveled surface 21 engages the outer surface of flange 23. Beveled surface 21 is such that, with continued pressure on outer surface 34, cover 11 is moved essentially longitudinally, by the sliding of pivot 12 in slot 26, toward and against the force of spring 29 until beveled surface 21 has cleared flange 23, at which point spring 29 forces cover 11 longitudinally in the opposite direction so that lip 20 engages the inner surface of flange 23 to lock cover 11 in its closed position.

The cover described above provides the advantages of being positively locked in its closed position and retained in two open positions without need of a special locking device. Very little force is required to open or close this cover, the force required to open it being advantageously reduced by optimum location of the force receiving recess, the pivot, and the elongate slot, and by the linear and angular dimensions of the surfaces comprising the wedge-shaped end. Further, this cover can be formed in one piece and from a variety of materials, including relatively inexpensive synthetic plastic materials.

Such a cover could be employed in a variety of ways on apparatus, such as photographic apparatus, for example, as a cover for the camera film cavity or as a holder and cover for securing batteries inside the camera. Similarly, such a cover could be used to hold batteries in a camera flash attachment or to close a flash-lamp socket, and, particularly in the latter uses, could be formed of a polished metal to serve not only as a retainer and/or closure but also as a flash reflector. Of course, the use of metal rather than plastic is not limited to such applications. Also, a cover to be used on a flash device could be formed of plastic material coated with a reflective surface to act as the reflector.

The recess that is provided as an aid in opening the cover can take a variety of forms. For example, instead of the simple, square-shaped slot illustrated, it could have a saw-tooth configuration or merely be grooved. The important feature of the recess or groove is that it is placed in such a way as to aid in opening the cover with a minimum of force.

Additionally, various other modifications of a cover according to this invention can be made by those skilled in the art. For example, the inner surface of the cover could be roughened or otherwise modified, when the cover is used to enclose a battery cavity, in order to provide a space for noting the date of insertion of the battery to assure that the batteries do not remain in the camera for an excessive period of time.

The invention has been described in detail with particular reference to a preferred embodiment thereof, but it will be understood that variations and modifications can be effected within the spirit and scope of the invention.

I claim:

1. A closure for a cavity in a body, said closure comprising:
   (a) a flange on said body overlying a portion of said cavity;
   (b) a cover hinged on said body and rotatable relative to said body between a closed position and at least one open position, said cover having an inner surface, a first end portion with a shoulder thereon to engage said flange when said cover is in said closed position, an outer surface, a second end portion that is wedged-shaped to provide an apex and an end surface forming an obtuse angle with said outer surface, a pivot adjacent to said second end portion to render said cover rotatable, and means on said outer surface adjacent to said pivot for receiving force externally applied to move said cover from said closed position;

(c) means defining a slot in said body to receive said pivot and permit translation of said cover toward and away from said flange when in said closed position; and (d) means in said body adjacent to said second end portion for biasing said cover toward said flange when in said closed position.

2. The closure claimed in claim 1 wherein said shoulder comprises a lip that engages said flange when said cover is in said closed position and a beveled surface forming an obtuse angle with said inner surface that engages said flange when said cover is rotated to said closed position.

3. The closure claimed in claim 2 wherein said wedge-shaped second end portion comprises an apex, an outer end surface forming an obtuse angle with said outer surface, and an inner end surface forming an obtuse angle with said inner surface, said inner end surface having a width approximately the same as that of said lip.

4. The closure claimed in claim 1 wherein said pivot lies on a line approximately bisecting said obtuse angle included between said outer surface and said end surface.

5. The closure claimed in claim 1 wherein said apex is rounded and has a radius of approximately one-half the distance between said inner surface and the axis of rotation of said cover.

6. The closure claimed in claim 1 wherein said biasing means comprises a compression spring and a bearing surface.

7. The closure claimed in claim 1 wherein said biasing means includes a bearing surface that engages said apex when said cover is in said closed position and engages said end surface when said cover is in an open position.

8. The closure claimed in claim 7 wherein said cover is further rotatable to another open position in which said bearing surface engages said outer surface adjacent to said end surface.

9. A closure for a cavity in a body, said closure comprising:

(a) a flange on said body overlying a portion of said cavity;

(b) a cover hinged on said body and rotatable relative to said body between a closed position and at least one open position, said cover having an inner surface, a first end portion with a shoulder thereon to engage said flange when said cover is in said closed position, an outer surface, a second end portion that is wedge-shaped to provide an apex and an end surface forming an obtuse angle with said outer surface, a pivot adjacent to said second end portion and lying on a line approximately bisecting said obtuse angle to render said cover rotatable, and means on said outer surface adjacent to said pivot for receiving force externally applied to move said cover from said closed position;

(c) means defining a slot in said body to receive said pivot and permit translation of said cover toward and away from said flange when in said closed position; and (d) means in said body adjacent to said second end portion for biasing said cover toward said flange when in said closed position, said biasing means including a compression spring and a bearing surface that engages said apex when said cover is in said closed position and engages said end surface when said cover is in an open position.

References Cited
UNITED STATES PATENTS

| | | | |
|---|---|---|---|
| 1,831,800 | 11/1931 | Bales et al. | 49—386 XR |
| 1,923,787 | 8/1933 | Largen | 49—386 XR |
| 2,557,749 | 6/1951 | Lundine | 49—386 |

KENNETH DOWNEY, Primary Examiner.

U.S. Cl. X.R.

220—35, 38; 49—394; 292—74